Figure 2:
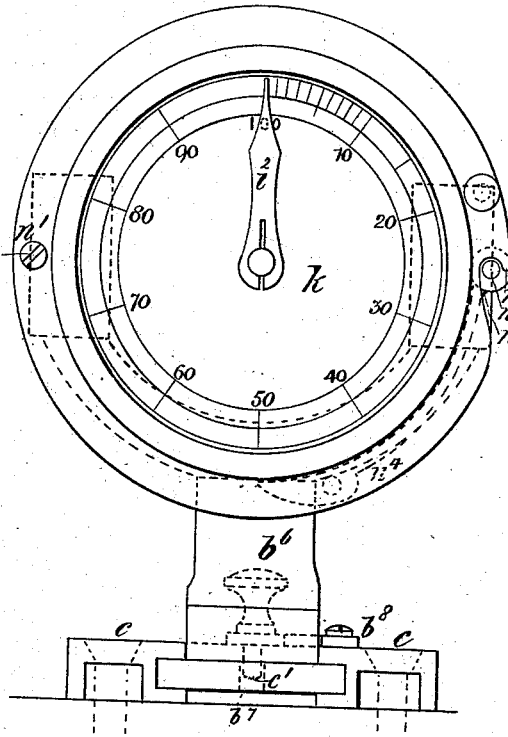

(Model.)
T. F. WALKER.
Ship's Log.
No. 238,187.  Patented Feb. 22, 1881.
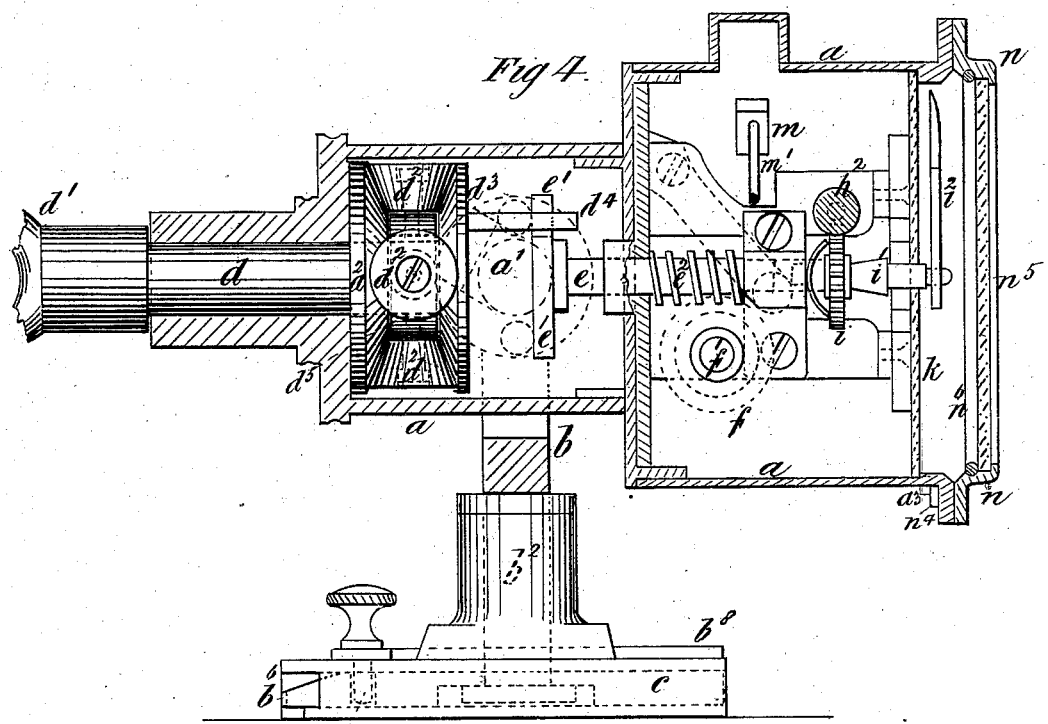
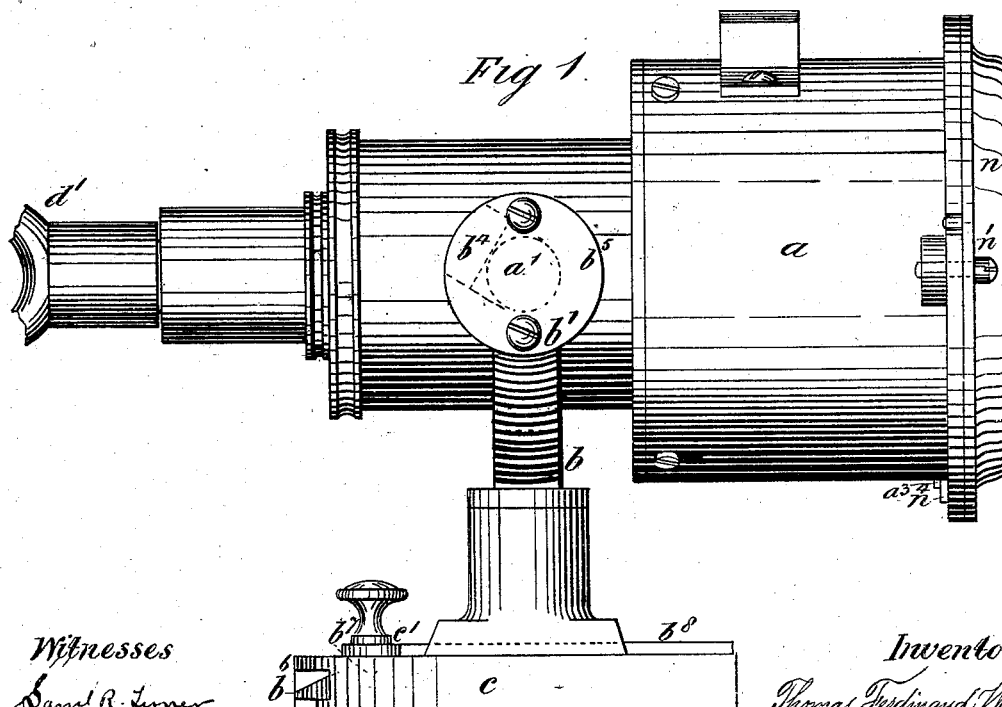
Witnesses
Sam'l R. Turner
Pennington Halsted
Inventor
Thomas Ferdinand Walker
by John J. Halsted
his Att'y (Model.)

T. F. WALKER.
Ship's Log.

No. 238,187. Patented Feb. 22, 1881.

Witnesses:
Saml. R. Turner
Pennington Halsted

Inventor:
Thomas Ferdinand Walker
by John J. Halsted
his Atty.

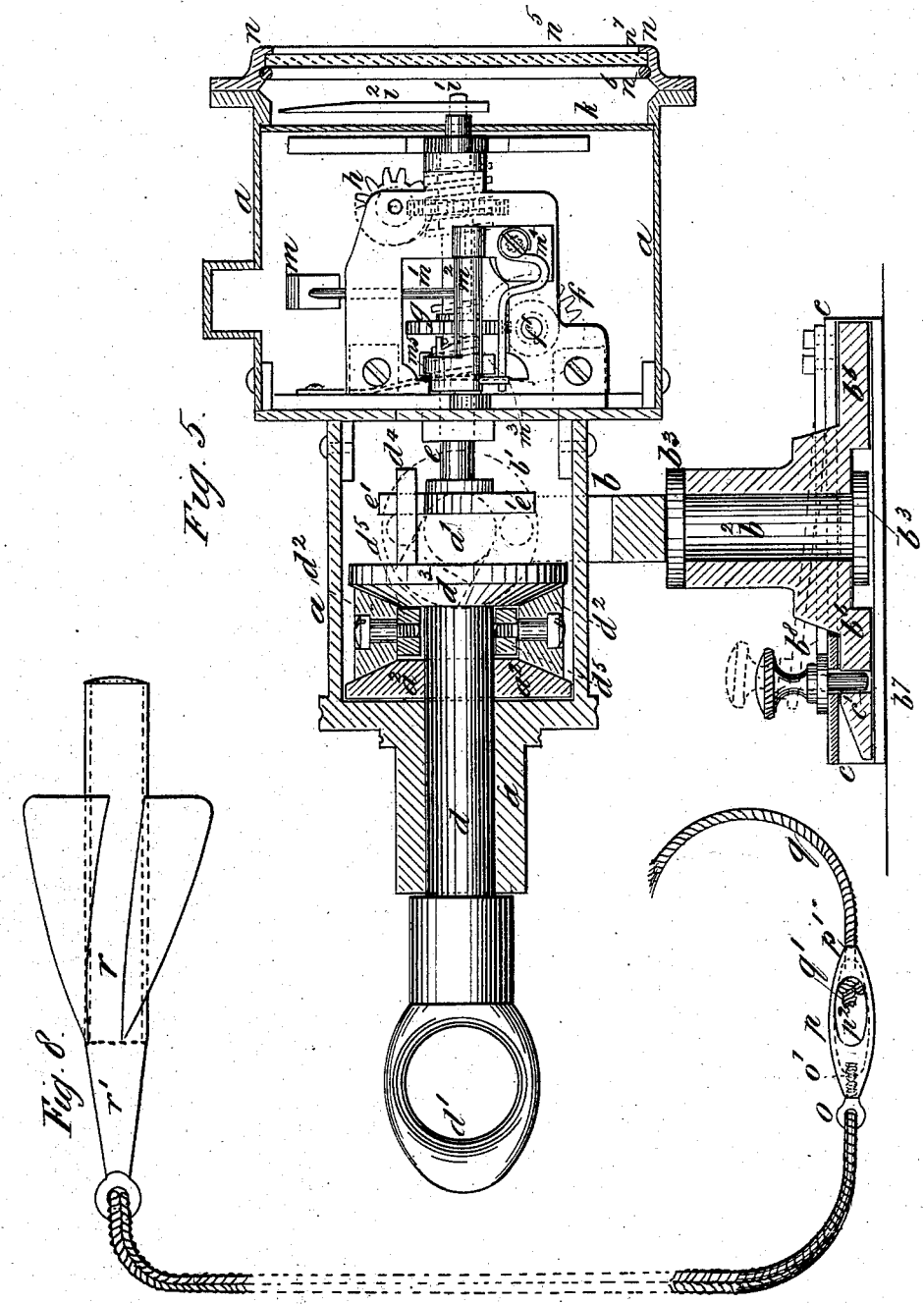

UNITED STATES PATENT OFFICE.

THOMAS F. WALKER, OF BIRMINGHAM, COUNTY OF WARWICK, ENGLAND.

SHIP'S LOG.

SPECIFICATION forming part of Letters Patent No. 238,187, dated February 22, 1881.

Application filed May 15, 1880. (Model.) Patented in England October 30, 1878.

*To all whom it may concern:*

Be it known that I, THOMAS FERDINAND WALKER, of Birmingham, in the county of Warwick, England, manufacturer, have invented new and useful Improvements in Ship's Log Apparatus, (for which I have obtained a patent in Great Britain, No. 4,369, bearing date the 30th day of October, 1878,) which improvements are fully set forth in the following specification, reference being had to the accompanying drawings.

The improvements relate to that class of apparatus for use in ascertaining, registering, and signaling the speed of vessels moving in water, in which the rotator employed to communicate the necessary motion to a train of wheel-work is, when in use in the water, separate from the wheel-work, which may be affixed to any suitable portion of the vessel whose speed is desired to be ascertained without hauling in or drawing in the rotator; and the object of the invention is to afford increased facilities in the use of such class of apparatus.

In carrying my invention into effect the rotator may be of the ordinary character of tube, with inclined wings or vanes; but I load the fore end thereof to prevent its jumping out of the water during use, and this rotator is connected by a rope of suitable length to an eye or loop formed with a screw-stem, to screw into a hollowed or chambered connecting-piece at one end thereof, while at its other end the connecting-piece is perforated to receive one end of another rope, and by a knot or enlargement thereon to retain such rope end from slipping or passing out, while this rope is connected at its other end to the spindle of that portion of the apparatus forming the registering wheel-work. By these means the disadvantageous eddy ordinarily produced by the knot, as generally used, is avoided or greatly reduced, facility is afforded for readily disconnecting the rotator, and the correct working of the apparatus is promoted. This wheel-work is contained in a case which is pivoted or supported by a compound or universal joint in a frame which is connected to any suitable part of the vessel whose speed is to be measured, so as to admit of free movement to such case, in order to adjust itself to variations in the inclination of the connecting-rope.

To increase the bearing-surface and reduce, as much as possible, the friction produced on the parts by the rotation of the spindle connected by rope to the rotator, I apply to such spindle a movable ring or collar carrying arms, on each of which is applied a conical friction-roller, the apex of the conical figure of which would, if continued, terminate in the center of such spindle, and these conical rollers revolve between corresponding conical surfaces. I also arrange the wheel-work in the case so that the dial or dials and the indicating-hands working with it or them may be in a plane at right angles, or thereabout, to the spindle immediately connected by rope to the rotator, and I apply a bell with a hammer capable of being acted upon by a part projecting from the axis of one of the train of wheels, so as to indicate audibly at intervals the working of the apparatus. A convenient interval for such striking I find to be ten-minute knots; but such interval may be varied. The advantage of the use of such audible signal is, that the working may be ascertained without the necessity for constant direct attention, and by placing the dial in the position indicated facility is afforded for viewing it at a distance.

That the invention may be the better understood, I will, by the aid of the accompanying drawings, proceed more fully to describe means pursued by me in carrying the same into effect.

Figure 3:
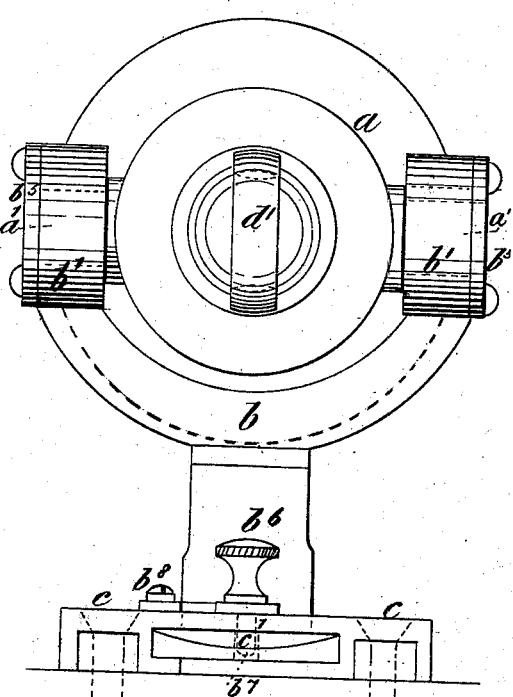
Figure 6:
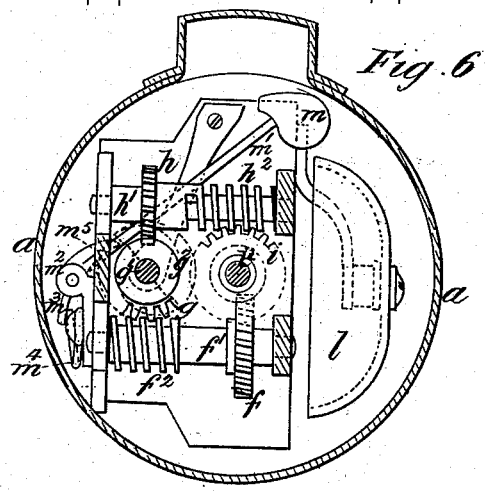
Figure 7:
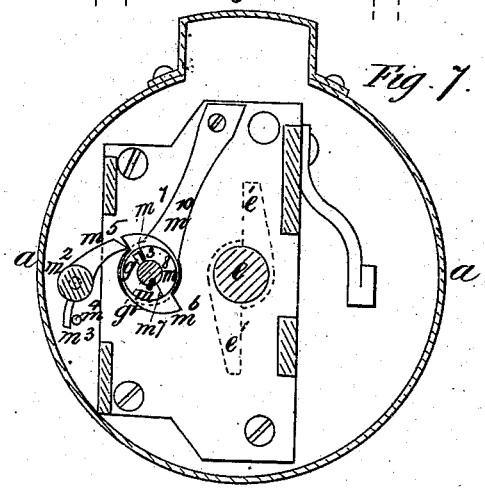

In the drawings, Figure 1 shows an external side view. Figs. 2 and 3 show opposite end views; Figs. 4 and 5, two sectional side views; Figs. 6 and 7, transverse sections of the wheel-work-register chamber; and Fig. 8 shows, by plan view, drawn to a reduced scale, a form of rotator employed with portions of rope and connecting-pieces thereon.

$a$ $a$ represent the case containing the registering wheel-work, and this case is formed with lugs or pivots $a'$, which are supported so that the case may rock in the upper ends, $b'$ $b'$, of the fork $b$, which is formed with a stem, $b^2$, and flanged foot or piece $b^6$, to pass into grooves formed for it in the plate $c$, and this plate $c$ may be permanently fixed to any suitable part of the deck-fittings. The lugs or pivots $a'$ $a'$ are retained in the parts $b'$ $b'$ by means of filling-pieces $b^4$, carried by plates $b^5$, which are secured to the parts $b'$ $b'$ by screws. The stem $b^2$ is formed to pass through and be secured by a collar, $b^3$, with capability of revolution in the foot or piece $b^6$, and this foot is then passed into the grooved plate $c$, and is secured therein without the risk of its jumping or sliding out of its socket by the pin $c'$, carried by the spring $b^8$, affixed by screws to the plate $c$, dropping into the hole $b^7$ in the plate or foot $b^6$, while for removal the milled head of the pin $c'$ is raised and the foot $b^6$ withdrawn from the grooved plate $c$. The case $a$ is thus supported by a compound or universal joint. The spindle $d$ is supported so as to freely revolve in the framing or case $a$, and it has applied to its inner end a movable ring or collar, $d^5$, carrying arms with conical rollers $d^2$, the apex of the conical figure of which rollers is coincident with the center of the spindle $d$, and these conical rollers revolve between a correspondingly conically-formed part, $a^2$, abutting against the case $a$ and that of the disk $d^3$ of the spindle $d$.

$d^4$ is a crank-pin projecting from the back of the disk $d^3$, to act on one of the lever-arms $e'$ of the screw-shaft $e$, the thread $e^2$ of which takes into the teeth of the wheel $f$ on the screw-shaft $f'$, the thread $f^2$ of which takes into the teeth of the wheel $g$ on the screw-shaft $g'$, the thread $g^2$ of which screw-shaft $g'$ takes into the teeth of the wheel $h$ on the screw-shaft $h'$, and the thread $h^2$ of the screw-shaft $h'$ takes into the teeth of the wheel $i$ on the shaft or axis $i'$ of the pointer $i^2$, to cause the rotation of that pointer; or, if desired, I can, by suitable change of the wheel-work, give motion to another or other pointers, carried by the same axis $i'$, or by other axis, to indicate successive movements of the parts.

It will be seen that the dial $k$ and the indicating-hand working with it are supported in a plane at right angles to the spindle $d$.

$l$ is a bell, and $m$ is the hammer for striking the same, to produce an audible sound or indication, and this hammer $m$ is carried by an arm, $m'$, carried by an axis, $m^2$, supported in bearings attached to this frame-work. This axis $m^2$ also carries a pin, $m^3$, which is constantly borne upon by a spring, $m^4$, so as to cause the hammer $m$ to be held in close proximity to the bell $l$, except when, by an arm or click, $m^5$, projecting from that axis $m^2$, being operated by an eccentric, $m^6$, applied to the axis $g'$, so that in the revolution of that axis the arm $m'$, carrying the hammer $m$, is swung at intervals, striking the bell $l$. To prevent injury to the parts should the wheel-work be turned in a wrong direction, the eccentric $m^6$ is applied loosely upon the axis $g'$, and is held fast to revolve with that axis in the direction desired by a pin, $g^3$, projecting therefrom coming against one or other of the flat projecting faces $m^7$ of the parts $m^8$ of the eccentric $m^6$, while when operated in a contrary direction the pin $g^3$ will harmlessly ride up the inclines $m^8$, leaving the bell-striking parts inoperative. A spring, $m^{10}$, bears the eccentric $m^6$ to the pin $g^3$.

$n$ is a metal frame, carrying the glass cover $n^5$ to the dial-plate and indicating hand or hands, and this cover swings upon a center-pin at $n'$, while at $n^2$ a recess or notch therein passes into and receives a pin, $n^3$, carried by a spring, $n^4$, at one end, while at its other end this spring is affixed, by screws $a^3$, to the case $a$, and by these means this cover is retained in position over the dial, while when removal is requisite the spring-pin $n^3$ is withdrawn from the notch $n^2$, and the cover $n$ swung off the dial-plate on its center of motion $n'$. The frame $n$ is formed with a groove, into which is sprung the wire $n^6$, to retain the glass $n^5$ between it and the flange $n^7$.

I load the fore end $r'$ of the rotator $r$, (of which Fig. 8 shows a convenient form for use,) so that such end may have a tendency downward, which in use will prevent it from jumping out of the water, and the rope therefrom is connected to the eye $o$, which eye $o$ has a readily-detachable screwed stem, $o'$, to screw into a hollowed or chambered connecting-piece, $p$, which is, at $p'$, formed with a hole to receive the end of another rope, $q$, and retain such end by means of a knot thereon at $q'$, which prevents such rope end passing entirely through the end of the connecting-piece, and this latter rope is then connected to the eye $d'$ of the main spindle or shaft $d$ of the indicator. $p^2$ indicates one of two or more holes provided in the sides of the piece $p$, for convenience of access to knot the end of the rope $q$. This load or weight is placed within the shell or skin of the rotator itself, and being thus internal it forms part and parcel of the rotator in its revolutions, thus giving a steadiness to the rotator in the water, and a very distinct disinclination to leave the direction or line of progress along which it is being hauled. At the same time, it will be observed that the mode in which the weight is applied avoids all the objections incident to a weight applied loosely on the exterior of the rotator and not positively rotating with it, and also incident to bulky weights, which must cause a serious impediment to progress.

What I claim is—

1. The combination of the parts of an improved ship's log apparatus, consisting of the rotator $r$ $r'$, having a loaded fore end within the outline or skin of the rotator itself, and the hollowed rope-connecting piece $p$, with its detachable eye $o$, substantially as and for the purpose described.

2. The hollowed rope-connecting piece $p$, with its detachable eye-connection $o$, having a screw-stem, $o'$, thereto, substantially as described and shown.

3. A rotator for use in ship's log apparatus, having its fore end internally weighted, such weight revolving or rotating with the rotator, as and for the purpose described.

4. The adaptation or combination of apparatus, substantially as described and shown, for registering and indicating the number of revolutions of the rotator $r$ and main spindle $d$, by the spindle $e$, screw $e^2$, wheel $f$, shaft $f'$, screw $f^2$, wheel $g$, shaft $g'$, screw $g^2$, wheel $h$, shaft $h'$, screw $h^2$, wheel $i$, shaft $i'$, indicator $i^2$, dial $k$, bell $l$, hammer $m$, shaft $m'$, and parts $m^2$, $m^3$, $m^4$, and $m^5$.

5. In combination with a ship's log apparatus, the removable cover or lid $n$ $n^6$ for the dial-case $a$, and the parts $n'$ $n^2$ $n^3$ $n^4$ $n^5$ $n^7$, substantially as shown and described.

In testimony whereof I have signed my name to this specification in the presence of two subscribing witnesses.

THOS. F. WALKER.

Witnesses:
 W. PRICE,
127 *Lodge Road, Birmingham.*
 J. RICHARDS,
*Dudley Road, Birmingham, in the county of Warwick, in the United Kingdom of Great Britain and Ireland.*